Aug. 6, 1968 L. L. OWEN 3,395,534
SPEED RESPONSIVE AND CONTROL SYSTEMS FOR ROTORS
Filed June 29, 1966
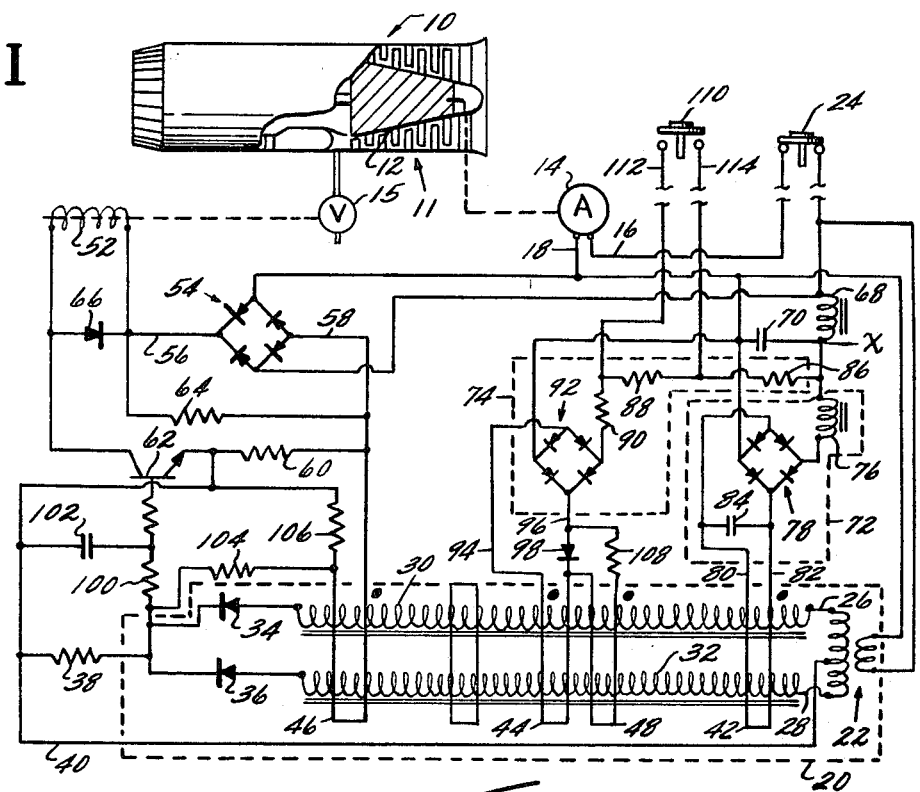
Fig 1
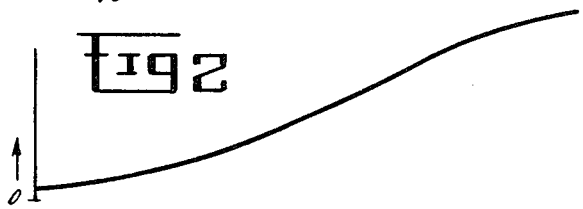
Fig 2
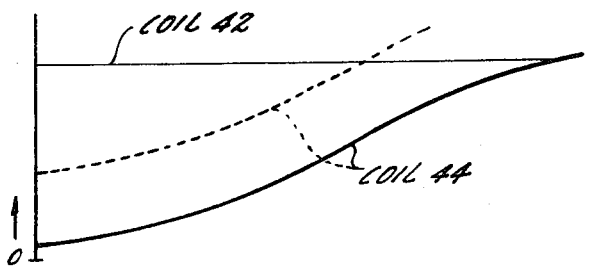
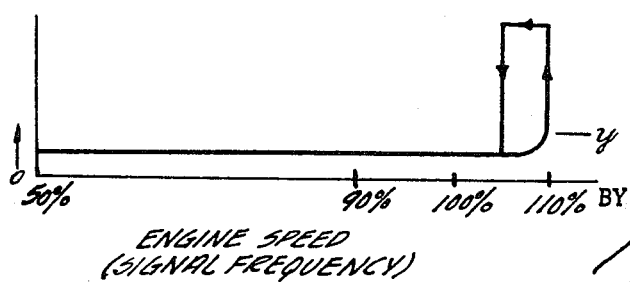
INVENTOR.
LOUIS L. OWEN
BY
ATTORNEY

United States Patent Office 3,395,534
Patented Aug. 6, 1968

3,395,534
SPEED RESPONSIVE AND CONTROL
SYSTEMS FOR ROTORS
Louis L. Owen, Cincinnati, Ohio, assignor to General
Electric Company, a corporation of New York
Filed June 29, 1966, Ser. No. 561,483
9 Claims. (Cl. 60—39.29)

ABSTRACT OF THE DISCLOSURE

A speed-responsive control system comprises means for generating a speed signal which increases in frequency and magnitude with the speed of the rotor. First and second signals are generated from the speed signal which respectively have different rates of variation relative to the speed signal. A predetermined relationship between the two signals indicates a maximum limit speed. When the limit speed is reached, the speed of the rotor is automatically reduced to a predetermined lower value. Means are provided for testing the system with the rotor at a speed lower than the limit speed.

---

The present invention relates to improvements in speed control systems particularly adapted for use with gas turbine engines.

Gas turbine engines comprise a compressor, having a rotor, for pressurizing air to increase the energy level of the hot gas stream generated by the engine. The rate of rotation of this rotor is commonly referred to as engine speed. In normal operation, engine speed is controlled by regulating fuel flow thereto. The rate of fuel flow is controlled in response to an operator or pilot demand signal input and as a function of various engine operating parameters, such as turbine inlet temperature, and the pressure ratio across the compressor.

Normal sustained operation of the engine, as under cruise conditions of an aircraft, is at a so-called 100% speed, this being the maximum engine speed which may be maintained for prolonged periods of time without adversely affecting fuel economy or engine operating life. Although operation at greater than 100% speed may be necessary for relatively short periods of time, nonetheless there is a limit speed, which, if exceeded, would adversely affect the mechanical integrity of the engine. It is, therefore, a known practice to provide a separate overspeed control for gas turbine engines in the event of some malfunction in the normal control system, as for example, a fuel metering valve could become stuck in a full flow position.

One object of the present invention is to provide a speed control system, particularly adapted for gas turbine engines, which will prevent operation of the engine in excess of such a limit speed.

Another object of the invention is to provide for testing the operability of such a system at a speed less than the so-called limit speed in order that the engine need not be strained in order to be certain that the overspeed circuit is capable of functioning correctly.

In a broader sense the object of the invention is to provide an improved and simplified control system for limiting the speed of a rotor.

A further object of the invention is to accomplish the above ends in a simple, economical, and reliable manner.

These ends are attained by the provision of means for generating a speed signal which increases in frequency and magnitude with the speed of a rotor. Means responsive to this speed signal generate first and second signals with one of the said signals varying at a rate greater than the rate of variation of the other signal relative to the speed signal. Means responsive to a predetermined relationship between the two signals are provided for changing the speed of the rotor when a given speed thereof, as reflected by said predetermined relationship, is reached.

In a more specific sense, an alternator generates a speed signal, having a frequency and magnitude which increases with the rate of rotation of a compressor rotor. The speed of rotation of the compressor rotor may be reduced by opening a valve which bleeds pressurized air from the compressor. This valve is controlled by a solenoid which is energized when the output of a magnetic amplifier reaches a predetermined level. The magnetic amplifier is provided with first and second control windings, one of which biases the magnetic amplifier to cutoff by means of a signal derived from the alternator speed signal. The signal applied to this one control winding remains substantially constant as the speed signal increases in frequency and magnitude as the limit speed is approached. A second control winding of the magnetic amplifier has a polarity opposing that of the first winding. A signal, also derived from the alternator speed signal, is applied to this second winding. As speed increases, the strength of the signal on the second winding increases to a point where it is equal to the signal strength on the first winding at a given limit speed, whereupon the output of the magnetic amplifier causes the solenoid valve to be actuated and the speed of the compressor rotor decreased. The magnetic amplifier is also provided with a positive feedback winding which is energized in response to energization of the solenoid and/or energization of the magnetic amplifier. The feedback winding maintains the magnetic amplifier energized until the signal strength on the second winding is reduced, as a result of a reduction in the speed signal, to a predetermined lower level, whereby once a limit speed is reached, the engine speed is automatically reduced to a substantially smaller value before speed of the engine can be controlled by the usual fuel controls provided for such purpose.

It is further preferable to provide means for testing the effectiveness of this system at a lower speed than the limit speed. To this end means are provided for increasing the strength of the signal on the second magnetic amplifier winding relative to the rate of rotation or speed signal so that the two signals of the two windings are equal and opposite at a lower speed, whereupon the engine speed will be automatically reduced and the operability of the system may be demonstrated without unduly straining the engine.

The above and other related objects and features of the invention will be apparent from a reading of the following description of the disclosure found in the accompanying drawing and the novelty thereof pointed out in the appended claims.

In the drawing:

FIGURE 1 is a diagrammatic and schematic view illustrating a circuit for controlling operation of a gas turbine engine in accordance with the present invention; and FIGURE 2 is a plot of various operating characteristics of the circuit seen in FIGURE 1.

For illustrative purposes the invention is described as it would be employed to prevent overspeed operation of a gas turbine engine 10 diagrammatically depicted in FIGURE 1. The engine 10 may be of conventional construction which includes an axial flow compressor 11, having a rotor 12, for pressurizing air to increase the energy level of a hot gas stream generated by the engine.

To further, briefly describe the environment of the present invention, the rate of rotation of the rotor 12 is commonly referred to as engine speed. For any engine there is a so-called 100% speed which is the maximum speed at which sustained operation can be maintained without unduly shortening engine life, as well as staying within safe operating limits for maintaining mechanical integrity of the engine. There may be occasions where operation of the engine at greater than 100% speed is desired for short periods of time. However, there is a limit speed which cannot be exceeded, even for short periods of time if mechanical integrity, in particular, is to be maintained. A typical limit speed is 110% speed.

The function of the present control is to prevent operation of the engine 10 at speeds in excess of such a limit speed and further to automatically reduce the engine speed to a substantially lower value before operation of the engine in response to normal control parameters is resumed. To this end a solenoid controlled valve 15 is energized, upon reaching of the limit speed, to bleed or vent a sufficient amount of air from the compressor discharge and thus reduce the rate of rotation of the rotor 12 to a predetermined value. When the lower speed value is reached, the valve 15 is de-energized and the usual fuel control system (not shown) may then control the engine speed. In other words, when the valve 15 is actuated to vent compressor discharge air, further increases in speed cannot be caused by any other engine control means.

The present control circuit comprises an alternator 14 which is mechanically connected to and driven by the compressor rotor 12. The alternator develops an A-C voltage signal across lines 16 and 18, which varies in frequency and potential proportionately with the rate of rotation of the rotor 12. The voltage output of the alternator 14 energizes all electrical components of the present circuit, as will later be apparent.

The leads 16 and 18 energize a magnetic amplifier 20, being connected across the primary of a transformer 22 thereof. It will be seen that the lead 16, before being connected to any of the remaining circuitry, extends first to a switch 24 which may be remotely located, as for example, in the pilot's cockpit, so that the present circuit may be selectively energized or de-energized if desired.

The output leads 26, 28 of the transformer 22 are respectively connected to a pair of gate windings 30, 32. The output of the gate windings 30, 32 passes respectively on alternate half cycles through solid state diodes 34, 36 respectively to develop a voltage across a dummy load resistor 38 which, in turn, is connected by lead 40 to a center tap on the secondary of the transformer 22.

The voltage output of the magnetic amplifier 20 is a function of the ampere turns developed in control windings 42, 44, and 46, as will later be explained. A biasing winding 48 is also provided and its function will likewise be later explained. Further, there is provided a time constant winding 50 which functions to prevent oscillation.

The valve 15 is controlled by a solenoid 52 which is also energized from the alternator 14. The alternator leads 16 and 18 are connected across a solid state diode bridge rectifier 54, having a direct current output across leads 56, 58, for energizing the solenoid 52. Lead 56 is connected directly to the solenoid 52, while lead 58 is connected in series with resistor 60 and transistor 62 to complete the circuit for energizing the solenoid 52 when the transistor 62 becomes conductive. A resistor 64 is also connected across the leads 56 and 58 to provide a dummy load for the rectifier 54 when the transistor 62 is non-conductive. A diode 66 is connected across the solenoid 52 to prevent an inductive kick back when the solenoid 52 is energized.

A speed signal is also derived from the alternator 14. Preferably the leads 16 and 18 are connected to a relatively low Q, tuned A-C filter comprising an inductance 68 and a capacitance 70. By so doing, an essentially sinusoidal speed signal is developed therebetween at point $x$ which increases at a relatively steep rate through a speed range from a speed substantially less than the limit speed up to at least the limit speed. This relationship is illustrated by the upper curve in FIGURE 2.

The speed signal, from point $x$, is fed to an inductance circuit 72, the output of which is applied across the control winding 42 of the magnetic amplifier 20. The same speed signal is also fed to a resistance circuit 74, the output of which is applied across the control winding 44 of the magnetic amplifier.

The inductance circuit 72 comprises an inductor 76 connected at one end to point $x$ intermediate the inductance 68 and capacitance 70. The opposite side of the inductor 76 provides one input to a solid state diode rectifier 78, with the other input thereto being provided by a connection with the alternator lead 18. The A-C voltage applied to the rectifier 78 provides a direct current output across leads 80, 82 which is filtered by a capacitance 84. The leads 80, 82 are connected to the coil 42 and provide a given value of ampere turns for controlling current flow through the gate windings 30, 32. The inductance of inductor 76 is selected so that its impedances likewise increase as speed signal frequency increases. The output current across the leads 80, 82 is caused to increase at a low rate or remains substantially constant. This results in the ampere turns of the coil 42 likewise remaining substantially constant over a frequency range of 50%–110% speed, as indicated in FIGURE 2.

The resistance circuit 74 comprises resistors 86, 88, and 90 connected in series from point $x$ to one input of a solid state diode rectifier 92. The other input to the diode rectifier 92 is provided by a connection to the alternator lead 18. The alternating signal input to the rectifier 92 provides a direct current output across leads 94, 96. This current output passes through a solid state diode 98, having a constant voltage drop thereacross, and is then applied to the control winding 44. The output current and hence the ampere turns of the coil 44 are a direct function of the magnitude of the speed signal, as is also indicated in FIGURE 2.

The windings 42 and 44 are of opposite polarity, and thus when the ampere turns of the coil 44 increase to a point approximately equaling the ampere turns of the coil 42, the gate windings 30, 32 will become conductive to the alternating current imposed thereon by the transformer 22. When this occurs, an increased output voltage is generated across the resistor 38. This output is filtered through resistor 100 and capacitance 102 to provide a triggering voltage at the base of transistor 62. The output voltage of the magnetic amplifier 20 is indicated in FIGURE 2. When a value $y$ is reached, the transistor 62 is triggered to energize the solenoid 52 and open the valve 15 to cause the engine speed to be reduced.

It will be appreciated that the rapid rise in output voltage from the magnetic amplifier 20 is attributable to the provision of the positive feedback winding 46. Thus it will be seen that a current flow path is provided from the resistor 38 through a resistor 104 connected to one side of the coil 46. Magnetic ampere feedback is completed by the connection between the coil 46 through resistor 60 back to resistor 38. Once the transistor 62 is triggered and the solenoid 52 energized, a further feedback path from the solenoid current flow is provided as the voltage drop across the resistor 60 is also impressed across the winding 46. A resistor 106 is provided to limit this feedback current flow.

By providing the positive feedback winding 46, the solenoid 52 will be maintained energized even after the engine is reduced below the limit 110% speed, and the valve 15 maintained opened to reduce the engine speed to a predetermined lower value. This is to say that the polarity of the feedback winding and the ampere turns thereof are sufficient to maintain the gate windings conductive at full strength after the ampere turns of winding 44 are reduced below the value which originally actuated the solenoid 52. When the ampere turns of the winding 42 overcomes both of the windings 44 and 46, there is an immediate reduction of the output voltage of the magnetic amplifier (see FIGURE 2), dropping its output voltage below the value $y$ and causing the transistor 62 to become non-conductive and simultaneously resulting in de-energization of solenoid 52. The solid curve in FIGURE 2, representing magnetic amplifier output voltage above value y, thus represents the cycle of operation of the solenoid 52, indicating that it maintains the valve 15 open until the speed of the engine is reduced to some lower predetermined value, say, 104% speed, and in this sense provides a dead band effect. Once de-energized, the solenoid 52 will not be re-energized until the limit speed of 110% is again reached. This dual feedback path provides a more constant dead band (or hysteresis) from turn on to turn off over the ambient temperature and variable excitation voltage range.

It is desirable that the functioning of the present control circuit be essentially unaffected by changes in temperature. To attain this end it is preferable that the resistor 86 of the resistance circuit 74 be of the type that provides a temperature compensating effect so that the current flow through the winding 44 remains constant as a function of temperature.

Another compensating effect is provided by the biasing winding 48. It will be noted that there is a slight bend in the increase of the output voltage from the magnetic amplifier as point y is approached. The rate of curvature of this bend changes as a function of excitation voltage and is an individual characteristic of a given magnetic amplifier. By properly biasing the magnetic amplifier with an appropriate number of ampere turns, the zero excitation voltage point of the family of curves generated with changes is applied voltage to the magnetic amplifier (20) may be placed at the value y so that the limit speed of 110% is maintained throughout a wide voltage excitation range. Advantageously the described arrangement wherein the constant voltage drop across diode 98, in combination with a resistor 108, provides this biasing current of constant value in an extremely economical and accurate fashion.

It is also desirable to test the present circuit without actually running the engine up to the 110% speed condition. To this end a pilot controlled switch 110 may be remotely located in the pilot's cockpit and connected by leads 112, 114 to opposite sides of the resistor 88 in the resistance circuit 74. Closing of the switch 110 short-circuits or bypasses the resistor 88, reducing the resistance of the resistance circuit 74 and increasing the current output thereof. This results in a higher current output and greater ampere turn values at a lower engine speed, say 90%, as reflected by the dashed curve in FIGURE 2. The result is that the control circuit now sees 90% as the limit speed and the solenoid 54 will be energized at this lower speed value, to reduce the engine speed to the same percentage lower value in the manner as above described. The pilot is thus able to be assured that the overspeed circuit is operative without actually subjecting the engine to the strain of testing the speed circuit at 110% speed.

While the described and preferred embodiment involved the use of electrical and electronic components, it is to be understood that the invention, in its broader sense, is based on the derivation of two different signals from a common speed signal to provide a control output. This and other variations from the described embodiment will be apparent to those skilled in the art, and the scope of the invention is to be derived solely from the following claims.

Having thus described the invention, what is claimed as novel and desired to be secured by Letters Patent of the United States is:

1. A speed-responsive control system comprising,
    means for generating a speed signal which increases in frequency and magnitude with increases in the speed of a rotor,
    means responsive to said speed signal, for generating a first signal which varies at a rate relative to said speed signal,
    means also responsive to said speed signal, for generating a second signal which varies at a rate greater than the rate of variation of said first signal relative to said speed signal, whereby the relationship between said first and second signals represents the actual speed of the rotor, and
    means responsive to a predetermined relationship between first and second signals, indicating a maximum rotor speed, for reducing the speed of said rotor to a predetermined value, substantially less than said maximum speed.

2. A speed responsive control system as in claim 1 wherein,
    the means responsive to a predetermined relationship between said first and second signals reduces the speed of said rotor to prevent the rotor exceeding a maximum speed value, and
    further wherein,
    means are provided for temporarily changing the predetermined relationship between the first and second signals at which the speed of the rotor is reduced, said changed relationship being at a lower speed whereby the system may be tested at other than a maximum speed.

3. A speed responsive control system as in claim 1 wherein,
    said first signal has one polarity and said second signal has an opposite polarity, and
    the predetermined relationship resulting in a reduction of the rotor speed is an equal value of said first and second signals.

4. A speed responsive control system as in claim 1 wherein,
    the means responsive to a predetermined relationship between the first and second signals includes a magnetic amplifier,
    said first signal comprises a first control winding for said magnetic amplifier and has a value substantially constant over a given value of speed signal frequency,
    said second signal comprises a second control winding for said magnetic amplifier having a polarity opposite to that of the first control winding and a strength which increases with the frequency of the speed signal from a value less than that of the first signal to a value at least equal thereto,
    and further wherein,
    the predetermined relation between the first and second signals is approximately an equal value therebetween and the means responsive thereto reduces rotor speed.

5. A speed responsive control system as in claim 4 wherein,
    the magnetic amplifier has a positive feedback winding of the same polarity as said second control winding, and
    further includes,
    means for energizing said feedback winding when the first and second signals approximate an equal value, said feedback signal strength being less than said first signal strength, whereby the means for reducing rotor speed will be maintained energized until the strength of said second signal is reduced a given amount, reflecting a predetermined reduction in the speed of said rotor.

6. A speed responsive control system as in claim 4 for use in combination with a gas turbine engine having a compressor which includes a rotor and the said rotor is the compressor rotor, and
    further wherein,
    the means for generating a speed signal include an alternator driven by said compressor rotor and having an output which varies in frequency and magnitude with the speed of said compressor rotor,
    the means for generating a first signal include an inductance circuit providing a signal output which is substantially constant as the frequency and magnitude of the speed signal increase, the means for generating the second signal comprise a resistance circuit having an output which increases with the magnitude of the speed signal, and the means for reducing compressor rotor speed include a valve for venting air from the compressor and a solenoid which is energized to open said valve and so vent compressor air.

7. A speed responsive control system as in claim 6 wherein, the output strength of the second signal is inversely proportional to the amount of resistance in the resistance circuit and means are provided for selectively reducing the resistance value of the resistance circuit whereby the speed of the engine rotor will be reduced at a lower value to thereby provide means for testing the control system.

8. A speed responsive control system as in claim 6 wherein, means are provided for biasing the magnetic amplifier so that the zero coefficient of excitation voltage therefor occurs substantially at the value of equal first and second signals of said control windings.

9. A speed responsive control system as in claim 6 wherein, means are provided for excitating the magnetic amplifier from said alternator, and means are provided for energizing said solenoid from said alternator.

References Cited

UNITED STATES PATENTS

| | | |
|---|---|---|
| 2,827,910 | 3/1958 | Wells et al. |
| 3,006,145 | 10/1961 | Sobey _____ 60—39.29 |
| 3,028,526 | 4/1962 | Wintrode et al. __ 60—39.28 XR |

JULIUS E. WEST, *Primary Examiner.*